United States Patent [19]

Kazama

[11] Patent Number: 4,858,038
[45] Date of Patent: Aug. 15, 1989

[54] SYSTEM OF DISK DEVICE SELECTOR CIRCUITS FOR DISK CONTROLLER

[75] Inventor: Kouji Kazama, Kanagawa, Japan

[73] Assignee: Mitsubishi Denki Kabushiki Kaisha, Tokyo, Japan

[21] Appl. No.: 33,745

[22] Filed: Apr. 3, 1987

[30] Foreign Application Priority Data

Apr. 4, 1986 [JP] Japan .............................. 61-50505[U]

[51] Int. Cl.⁴ ...................... G11B 19/00; G11B 5/012; G06F 3/00
[52] U.S. Cl. ......................................... 360/69; 360/51; 364/200
[58] Field of Search ....................... 360/48, 51, 63, 69, 360/78, 73, 97–99, 73.03, 78.01, 98.01; 364/200, 900

[56] References Cited

U.S. PATENT DOCUMENTS

| | | | |
|---|---|---|---|
| 3,950,735 | 4/1976 | Patel | 360/73 |
| 4,103,338 | 7/1978 | Cizmic et al. | 364/900 |
| 4,183,084 | 1/1980 | Lawson | 364/200 |
| 4,480,277 | 10/1984 | Hara et al. | 360/69 |
| 4,644,419 | 2/1987 | Iinuma et al. | 360/51 |
| 4,651,238 | 3/1987 | Ishikura | 360/48 |
| 4,700,243 | 10/1987 | Tsuyuguchi et al. | 360/69 |

FOREIGN PATENT DOCUMENTS

| | | | |
|---|---|---|---|
| 58-169366 | 10/1983 | Japan | 360/69 |
| 1469731 | 4/1977 | United Kingdom | |

OTHER PUBLICATIONS

Electronics vol. 53, No. 10 "Controller Handles Floppies, Fixed Disks", Le Boss, 4/80, p. 208.

Primary Examiner—Aristotelis M. Psitos
Assistant Examiner—Steven R. Garland
Attorney, Agent, or Firm—Bernard, Rothwell & Brown

[57] ABSTRACT

A system of disk device selector circuits for a disk controller, which is provided for the disk controller to which different types of plural magnetic disk devices are connected via common control signal lines and each of the magnetic disk devices, for selecting one out of the different types of the disk devices by means of a selection controlling circuit provided in the disk controller. Each of the magnetic disk devices is provided with a response signal outputting circuit whereby a response signal indicating that the device has been selected is output when the disk device selected by the selection controlling circuit of the controller is the device itself. The response signal is received by a response signal receiving circuit provided in the controller via a common reply signal line from the selected magnetic device, whereby the controller can recognize the type of the selected disk device and set up the correct data transferring rate between that type of the device and the controller itself, and thus occurrence of data reading errors and other troubles can be prevented and smooth operation of the overall system can be achieved.

4 Claims, 6 Drawing Sheets

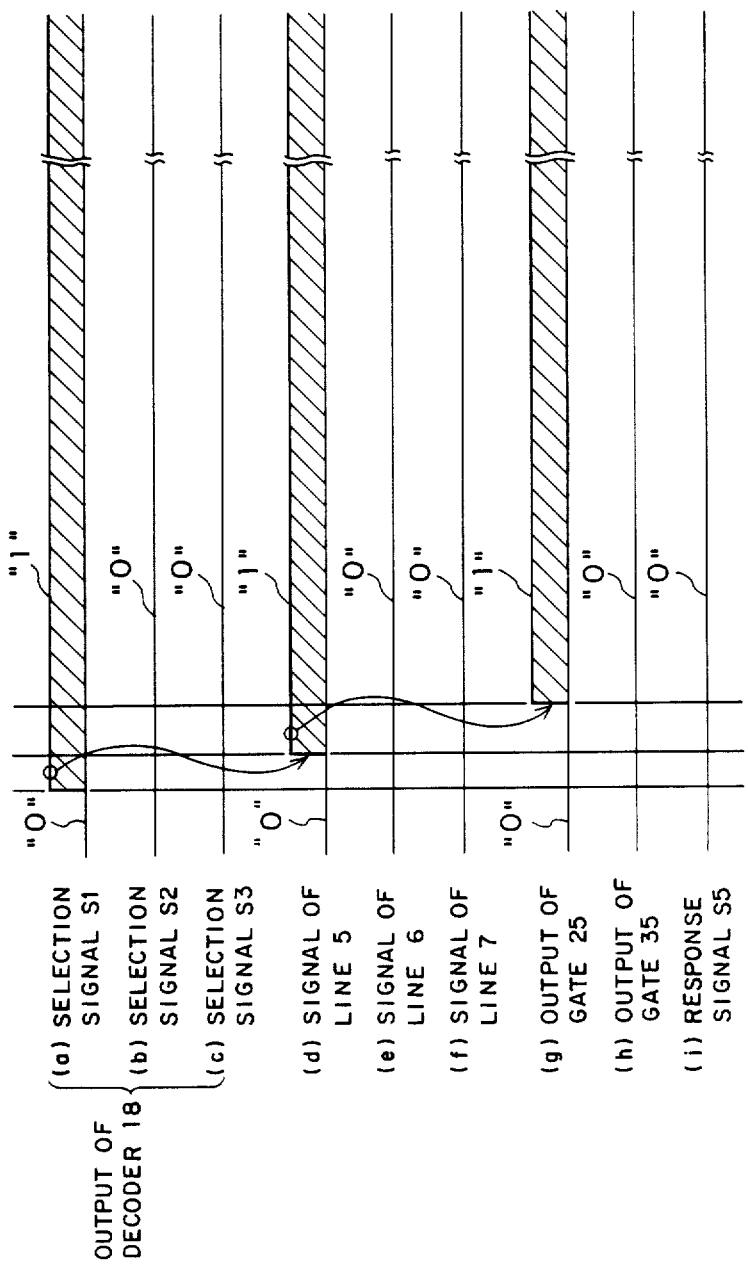

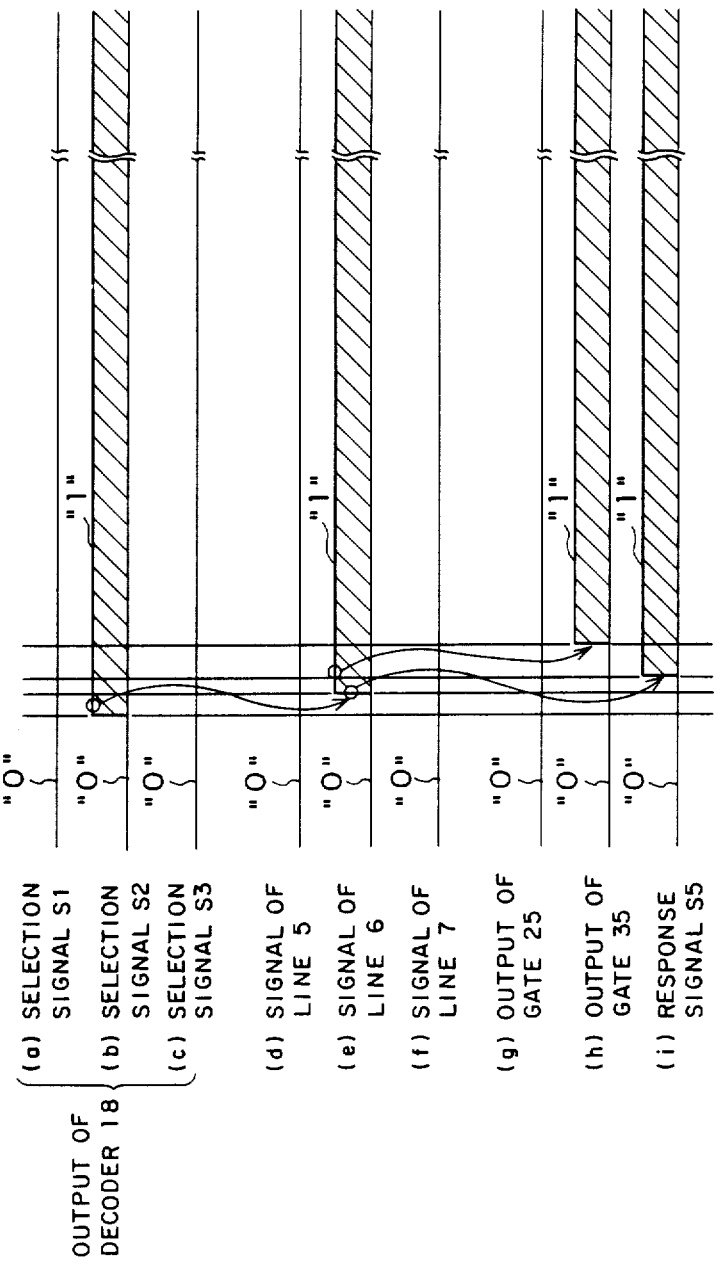

SYSTEM OF DISK DEVICE SELECTOR CIRCUITS FOR DISK CONTROLLER

BACKGROUND OF THE INVENTION

1. Field of the Invention

The present invention relates to a system of selector circuits for selecting one out of a plurality of disk devices, such as, for example, different types of plural magnetic disk devices, connected to a controller through common control signal lines, and more particularly, to a system of disk device selector circuits enabling a disk controller to correctly recognize the type of the disk device that has been selected by and connected to the same and thereby to correctly set up the data transfer speed between the disk device and the controller.

2. Description of the Prior Art

With the rapid advancement of the magnetic recording technology in recent years, and, specifically, owing to increase in the recording density of the magnetic recording media, improvement in the recording formats, and betterment of performances of the magnetic recording devices, magnetic disk devices of various types have come into wide use. Since these devices have different data transfer rates, recording capacity, and recording formats on account of different recording density of the magnetic diskette as their object of reading and writing, they have to be provided with different types of control for reading data suitable for different types when they are connected to a data transfer system. If such control should be provided individually for each type, it would not only reduce the data processing speed, but also necessitate providing a dedicated controller for each device, and this was a problem with the prior art device in respect of time, space, and cost.

Therefore, there have been proposed various circuit designs which connect a controller, capable of selecting any device from a plurality of magnetic disk devices and exercising various controlling operations, with the selected disk device. FIG. 1 is a block diagram showing an example of such a system of disk device selector circuits of the prior art. Referring to the figure, a disk controller 1 and each of disk devices 2 and 3 of different types, such as types (A) and (B), are connected via control signal lines 5-8. The controller 1 is provided therein with a device selection controlling portion 10 and selection signal transmitting gates 11, 12, 13, and 14 interposed between the device selection controlling portion 10 and the control signal lines 5-8. The disk device 2 of the type (A) is provided therein with an address setting circuit 20 and a selection signal receiving gate 25, and the address setting circuit 20 is provided therein with address setting switches 21-24 which are respectively connected to branch lines 5A-8A of the control signal lines 5-8. The disk device 3 of the type (B) is also provided therein with an address setting circuit 30 and a selection signal receiving gate 35, the address setting circuit 30 being provided therein with address setting switches 31-34 connected respectively to branch lines 5B-8B of the control signal lines 5-8. From the fact that four each of selection signal transmitting gates 11-14 and control signal lines 5-8 are provided in the present example, it is known that there are provided totally four sets of disk devices, including, in addition to the above, third and fourth disk devices of different types such as types (C) and (D). Since the additional two disk devices have similar internal structure and external connections to the disk devices 2 and 3, these are omitted from the illustration.

The internal organization of the disk controller 1 shown above in FIG. 1 is formed as shown in a block diagram of FIG. 2. Referring to the figure, the disk controller 1 includes a switching means 101 for ON-OFF operation for selecting one from the disk devices 2, 3, . . . , an input bus 102 for outputting to selection controlling means 10 a two-bit address signal provided by software in a computer or the like not shown based on an ON signal output from the switching means 101 then in the ON state, a register 17 which constitutes the selection controlling means 10 and in which the address (two-bit) signal is established by the software through the input bus 102, and a decoder 18 for outputting the address signal established in the register 17 as selection signals S1-S4 to each disk device 2, 3, . . . The transmission gates 11-14 to which the selection signals S1-S4, the outputs of the decoder 18, are input are more particularly formed of AND circuits as shown in FIG. 2, and these transmission gates 11-14 formed of AND circuits are so arranged that their two input terminals each are short-circuited into one input signal line. The disk controller 1 further includes a transmission line 103 for transmitting the data signal output from the disk device 2 or 3, a data receiving circuit 105 for receiving the data signal, and a disk control unit 106 for outputting, upon receipt of the data signal, a control signal to the selected disk device 2 or 3 through the register 17 and the decoder 18.

The two-bit device addressing signal set up in the register 17 is output to the disk device 2 or 3 through the decoder 18. Therefore, the selection signals S1-S4 are arranged to be in such condition that only one thereof is in the ON state, i.e., the enabled state.

Operation of the prior art system of selector circuits with described structure will be described in the following. An address signal for selecting one disk device from a plurality of disk devices of, for example, types (A)-(D) is generally output as a binary digital signal. In the example shown in FIG. 1, however, selection signals S1, S2, S3, and S4, which correspond to decoded signals of an address signal, are output from the device selection controlling portion 10. That is, in the case where the disk device 2 of type (A) is to be selected, the device selection controlling portion 10 outputs signals in which the selection signal S1 is set to logical "1" and selection signals S2-S4 are set to logical "0". And, in the case where the disk device 3 of type (B) is to be selected, the device selection controlling portion 10 outputs signals in which the selection signal S2 is set to logical "1" and signals, S1, S3, and S4 are each set to logical "0". Further, in the case where the third disk device of type (C) which is not shown is to be selected, the device selection controlling portion 10 outputs signals in which the selection signal S3 is set to logical "1" and signals, S1, S2, and S4 are set to logical "0", and in the case where the fourth disk device of type (D), not shown, is to be selected, the device selection controlling portion 10 similarly outputs signals in which the selection signal S4 is set to logical "1" and signals S1-S3 are set to logical "0". In this connection, such an expression will hereinafter be used as, "an address signal of the bit pattern for selecting an arbitrary one out of a plurality of magnetic disk devices is delivered", including the case as described above where selection signals corresponding to decoded signals of an ordinary address signal are delivered. In the above described example, the bit pattern for selecting the disk device 2 of type (A) is "1000". It is a matter of course that a two-bit digital signal can be delivered as an ordinary address signal for selecting, for example, one disk device out of four devices, where, however, the manner of connections of the setting switches in the address setting circuit will be different from that in FIG. 1.

In the case where the above mentioned selection signals S1–S4 are delivered via selection signal transmitting gates 11–14, if it is arranged, as shown in FIG. 1, such that, for example, only the setting switch 21 in the disk device 2 of type (A) connected with the branch line 5A of the control signal line 5 is closed, and, such that, for example, only the setting switch 32 in the disk device 3 of type (B) connected with the branch line 6B of the control signal line 6 is closed, then, the disk device 2 of type (A) will be selected when the device selection controlling portion 10 sets the selection signal S1 to logical "1" causing the transmitting gate 11 to output a signal of logical "1" through the branch line 5A of the control signal line 5 to the receiving gate 25, and the disk device 3 of type (B) will be selected when the device selection controlling portion 10 sets the selection signal S2 to logical "1" causing the transmitting gate 12 to output a signal of logical "1" through the branch line 6B of the control signal line 6 to the receiving gate 35.

There are concrete examples of the disk devices temporarily described above as those of types (A)–(D) such as, if flexible disk devices are taken by way of example, a double density flexible disk device (hereinafter to be referred to as a 2DFDD) capable of reading data from a double density flexible disk (hereinafter to be referred to as a 2D disk) and capable of writing data in the 2D disk and a high density flexible disk device (hereinafter to be referred to as an HDFDD) capable of reading data from a high density flexible disk (hereinafter to be referred to as an HD disk) and capable of writing data in the HD disk. In the case where a number of various types of disk devices inclusive of such a 2DFDD and HDFDD are simultaneously connected to a disk controller, the data transferring rates between the disk controller 1 and each of the disk devices 2, 3 are generally different in each of the operations for the 2DFDD to read out data from a 2D disk, for the HDFDD to read out data from an HD disk, and for the HDFDD to read out data from a 2D disk. Therefore, the disk controller 1 must read the type of the disk device which has been selected by and connected to the same and have the data transfer rate suitable for that type set up by a data receiving circuit, which is not shown, for reading data out of the disk device. When, in such a case, the data stored in the sheet was read out at a wrong rate, there were sometimes produced such errors as loss of data.

Since the prior art system of selector circuits was structured as described above, the type of the disk device selected by and connected to the disk controller was not indicated from the disk device to the disk controller. Therefore, it was difficult to have the data transfer rate set up by the data receiving circuit provided in the disk controller to the right value matched with the selected and connected disk device. And, as described above, errors were sometimes produced when data were read at a wrongly set data transfer rate resulting in malfunction or troubles of the overall system.

As a measure to overcome the described problem, there is proposed "RECORDING MEDIUM READ/WRITE CONTROL SYSTEM", U.S. patent application Ser. No. 596,274, now U.S. Pat. No. 4,651,238, applied by the present applicant, MITSUBISHI DENKI KABUSHIKI KAISHA. That is, in that control system, it is enabled that different types of magnetic disk devices are recognized and read control of data suited to each of the types is exercised. In the system, there are provided type recognizing switches as the means for recognizing different types of the disk devices, and it is adapted such that data read control corresponding to the specific type of the disk device is exercised according to the state of setting of the switches.

SUMMARY OF THE INVENTION

An object of the present invention is the provision of a system of disk device selector circuits wherein the data transfer rate between a disk controller and the disk device selected by and connected to the controller will be correctly set up according to the type of that disk device.

Another object of the present invention is the provision of a system of disk device selector circuits wherein the overall system will smoothly operate with occurrence of data reading errors, malfunction, and troubles prevented by correct setting of the data transfer rate as described above.

To achieve the above mentioned objects, the system of disk device selector circuits according to the present invention is provided with selection controlling means for selecting a disk device from different types of the same and address setting means provided in each of the disk devices selectable by the selection control means, wherein it is adapted such that, when a disk device is selected based on a selection signal to be output from the selection control means, an identification signal indicative of the type of the disk device is output as a response signal to the selection from response signal outputting means provided in each device to the disk controller in which the selection controlling means is provided, so that the response signal is received by response signal receiving means provided in the controller.

BRIEF DESCRIPTION OF THE DRAWINGS

FIG. 5, consisting of (a)–(i), is a time chart for showing signals at some portions when the disk device 2 of type (A) was selected by the system of selector circuits according to the embodiment shown in FIGS. 3, 4;

FIG. 6 consisting of (a)–(i) is a time chart for showing signals at some portions when the disk device 3 of type (B) was selected by the same system.

DETAILED DESCRIPTION OF THE PREFERRED EMBODIMENTS

Some preferred embodiments of a system of disk device selector circuits according to the present invention will be described in detail with reference to accompanying drawings in the following.

Figure 1:
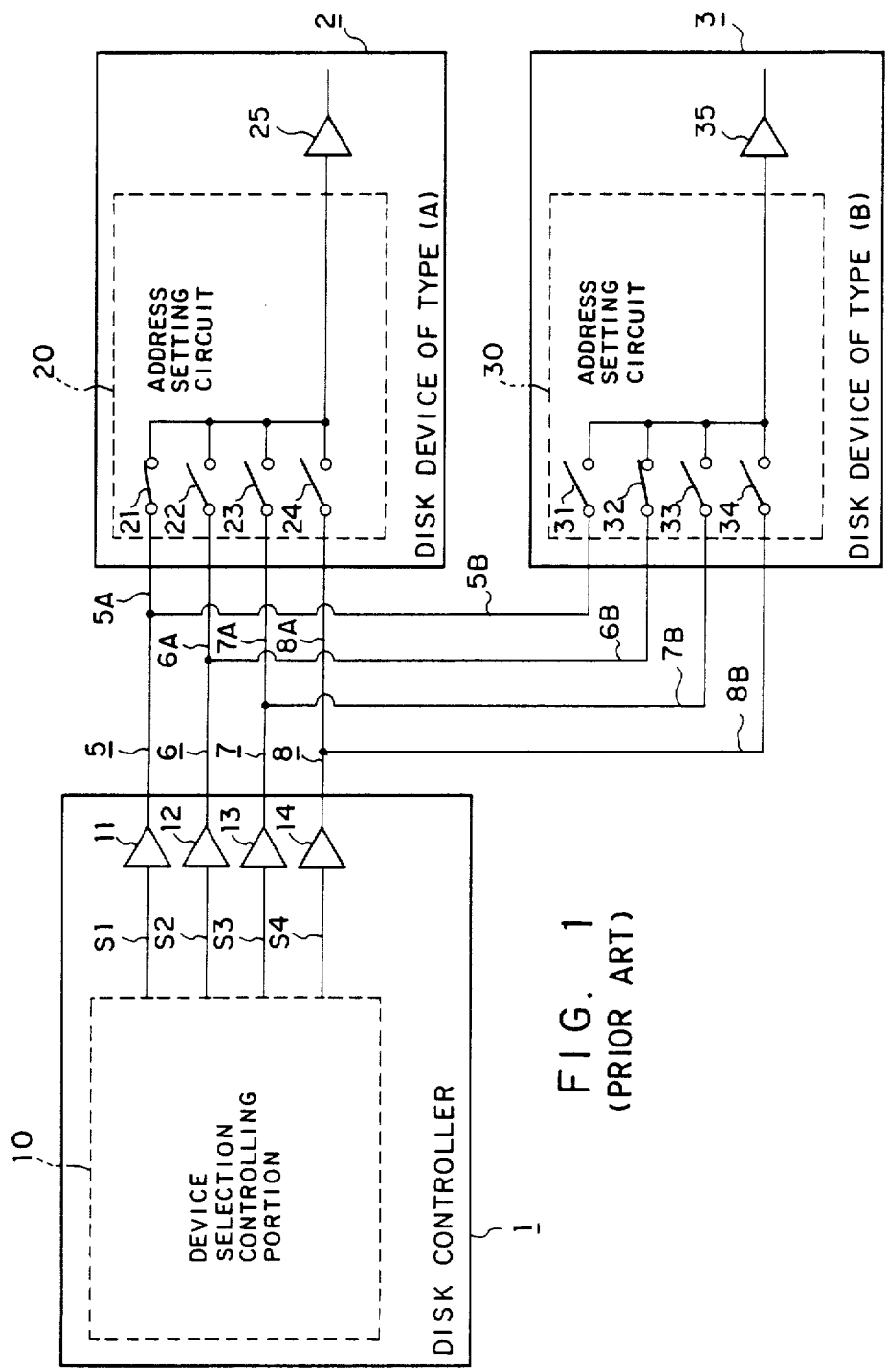
FIG. 1 is a schematic block diagram showing an example of a prior art disk device selector circuit.
Figure 2:
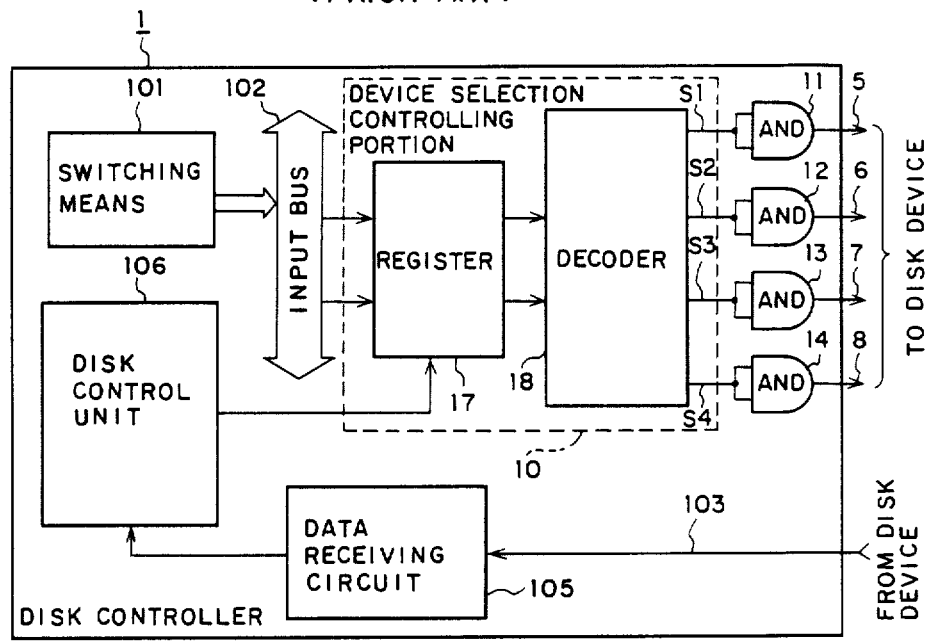
FIG. 2 is a block diagram for describing particulars of disk controller in the prior art disk device selector circuit shown in FIG. 1.
Figure 4:
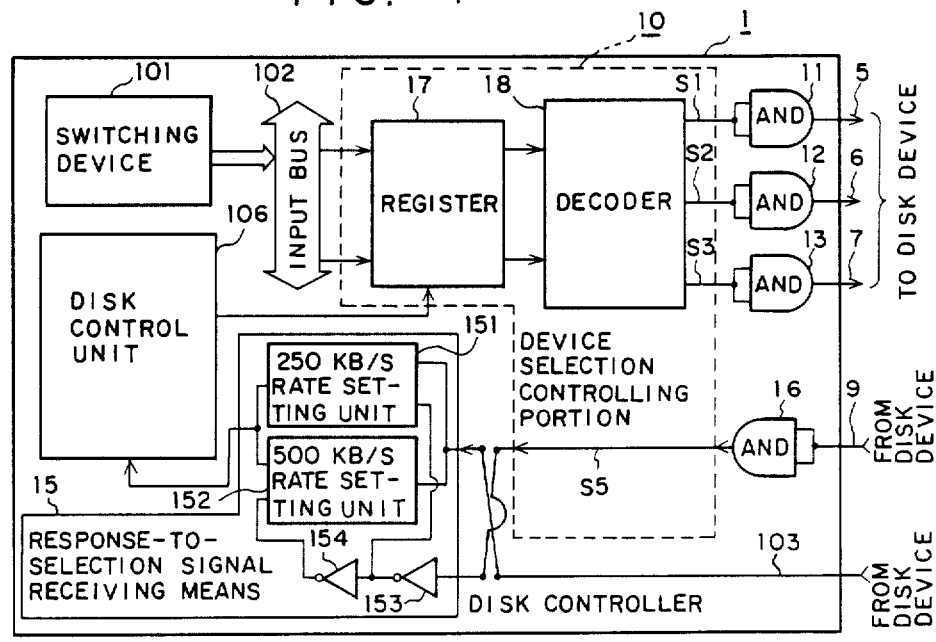
FIG. 4 is a block diagram for describing particulars of the disk controller in the embodiment of FIG. 3.
Figure 3:
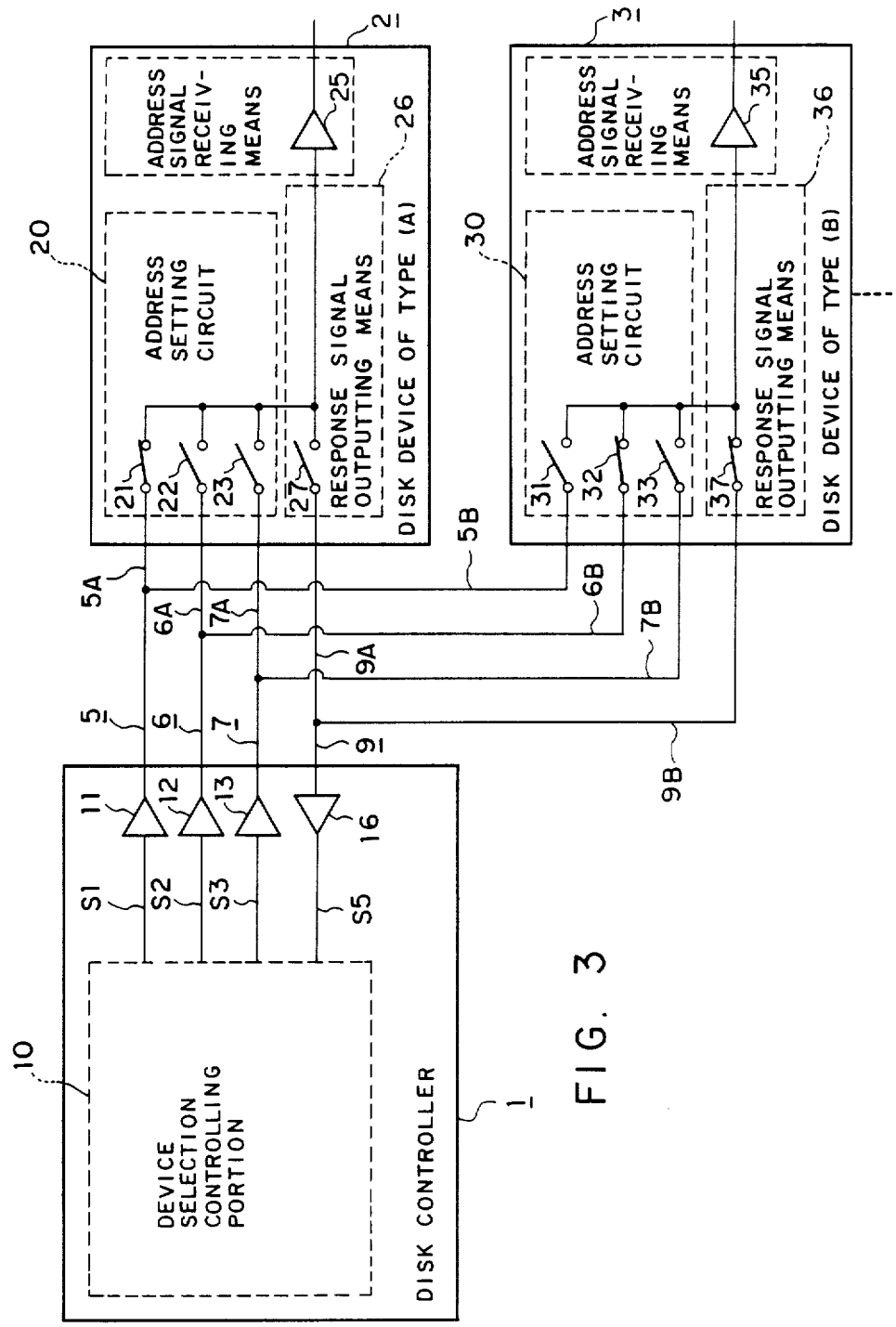
FIG. 3 is a schematic block diagram for explaining one of the preferred embodiments of a system of disk device selector circuits for a disk controller according to the present invention.

Referring to FIG. 3 and FIG. 4 which show one embodiment of the present invention, parts in FIGS. 3 and 4 corresponding to those in FIGS. 1 and 2 are designated by the same reference numerals of the parts in the prior art system of circuits described above. That is, in the present embodiment, a disk controller 1 is provided with selection controlling means 10 and selection signal transmitting gates 11-13, a disk device 2 for type (A) is provided with address setting means 20 having address setting switches 21-23 and a selection signal receiving gate 25, and a disk device 3 of type (B) is provided with address setting means 30 having address setting switches 31-33 and a selection signal receiving means 35. The disk device 2 of type (A), for example, is the above described 2DFDD and the disk device 3 of type (B), for example, is the above described HDFDD. To the junction point between the address setting means 20 and the selection signal receiving gate 25 in the disk device 2, there is provided a response signal outputting means 26 having a switch 27, and also in the disk device 3, there is provided response signal outputting means 36 having a switch 37. Further, the disk controller 1 is provided with a response-to-selection signal receiving means 15, shown in FIG. 4, and a response-to-selection signal receiving gate 16. The signal receiving gate 16 and the outputting means 26 and 36 are connected by response signal lines 9, 9A and 9B.

Particulars of the internal organization of the disk controller 1 shown in FIG. 3 are given in a block diagram of FIG. 4. Referring to FIG. 4, the parts denoted by like reference numerals to those in FIG. 2 are like or corresponding parts and explanation about the same are omitted. In the present embodiment, however, the transmission gates formed of AND circuits provided are only three in number and the transmission line 103 for the data signal is connected to the response-to-selection signal receiving means 15. The response-to-selection signal receiving gate 16 is also connected to the receiving means 15 through the selection controlling means 10. The receiving means 15 is provided therein with a 250 KB/S-rate setting unit 151 and a 500 KB/S-rate setting unit 152 connected in parallel and a series connection of two inverters 153 and 154 connected between the rate setting unit 152 and the gate 16. And, the junction point between the inverter 153 and the inverter 154 is connected with the rate setting unit 151.

This embodiment is similar to the apparatus of the prior art described referring to FIG. 2 in that the two-bit device addressing signal set up in the register 17 is output to each disk device through the decoder 18, but in the present embodiment, three selection signals S1-S3 are used with only one signal thereof is put in an enabled state.

Operation according to the system of selector circuits constituted as above will be described in the following. In the present embodiment, it is arranged such that, when a disk deice is selected, a response-to-selection signal of a one-bit structure is output as a response to the selection as well as the switch 27 is set to remain open and the switch 37 is set to remain closed, whereby it is indicated that the disk device of type (B), i.e., the HDFDD, has been selected when the response signal is logical "1", or that the disk device of type (A), i.e., the 2DFDD, has been selected when the response signal is logical "0". Therefore, when the selection controlling means 10 of the disk controller 1 has selected the disk device 2 of type (A), the selection signal S1 is delivered via the selection signal transmitting gate 11, the control signal lines 5 and 5A, and the setting switch 21 to the receiving gate 25, when, since the switch 27 of the response signal outputting means 26 is open, a response signal S5 of logical "0" is provided via the response signal lines 9A and 9 for the response signal receiving gate 16 and the selection controlling means 10, and thereby, the disk controller 1 can confirm that the disk device 2 has been selected. And, when the selection controlling means 10 of the disk controller 1 has selected the disk device 3 of type (B), the selection signal S2 is delivered via the transmitting gate 12, the control signal lines 6 and 6A, and the setting switch 32 to the receiving means 35, when, since the switch 37 of the disk device 3 is closed, a response signal S5 of logical "1" indicating the fact that the disk device 3 has been selected is provided through the response signal lines 9B and 9 for the response signal receiving gate 16 and the selection controlling means 10, and thereby, the disk controller 1 can confirm that the disk device 3 has been selected.

Operations of some parts within the disk controller 1 when it received the response signal S5 will be described below. When the response signal S5 was received into the disk controller 1 through response-to-selection signal receiving gate 16, the response signal S5 is delivered to the response-to-selection signal receiving means 15 through the selection controlling means 10. The response-to-selection signal receiving means 15 establishes the right data transfer rate according to presence or absence of the response signal S5. More particularly, in the present embodiment, when the response signal S5 is "0", a transfer rate of 250 KB per second is established by the 250 KB/S-rate setting unit 151, and when the response signal S5 is "1", a transfer rate of 500 KB per second is established by the 500 KB/S-rate setting unit 152.

Operational timing in the system of the selector circuits of disk devices organized as above will be described with reference to the timing charts of FIGS. 5 and 6. Firstly, the operational timing in the case where the disk device 2 of type (A) was selected is as shown in FIG. 5. Of the selection signals S1-S3 as outputs of the decoder 18, only the selection signal S1 is turned from "0" to "1" as shown in FIG. 5(a)-(c). The selection signal S1 is output to the disk devices 2, 3 delayed by a predetermined period of time by means of the transmission gate 11 as shown in FIG. 5(d). In each disk device 2, 3, the output of the receiving gate 25 of the disk device 2 turning from "0" to "1" as shown in FIG. 5(g) and (h) indicates that the disk device 2 of type (A) was selected, and hence the disk device 3 of type (B) with the operating waveform remaining "0" was not selected. When the disk device 2 of type (A) was selected, the output from the signal line 9, i.e., the response signal S5, is delivered in the unchanged "0" state, and thus, the transfer rate in the case where it is in the "0" state, 250 KB/S, for example, is established as described above. Next, the case where the disk device 3 of type (B) was selected will be described with reference to each of the timing waveform charts in FIG. 6. When type (B) was selected, the outputs of the decoder 18 are delivered in such a way that only the selection signal S2 thereof is turned from signal line 6 through the transmission gate 12 is turned from "0" to "1" delayed by a predetermined period of time and transmitted to the disk devices 2, 3. When the selection signal S2 being "1" comes in, the receiving gate 35 in the disk device 3 of type (B) outputs the significant signal "1" whereby it is indicated that the disk device 3, not the disk device 2, was selected. When the disk device 3 was selected, since the switch 37 of the response signal outputting means 36 is closed, the response signal S5 output through the signal lines 9B, 9 becomes the significant signal "1", and upon receipt of the response signal S5 being "1", the rate setting unit 152 sets the transfer rate at 500 KB/S.

Figure 7:
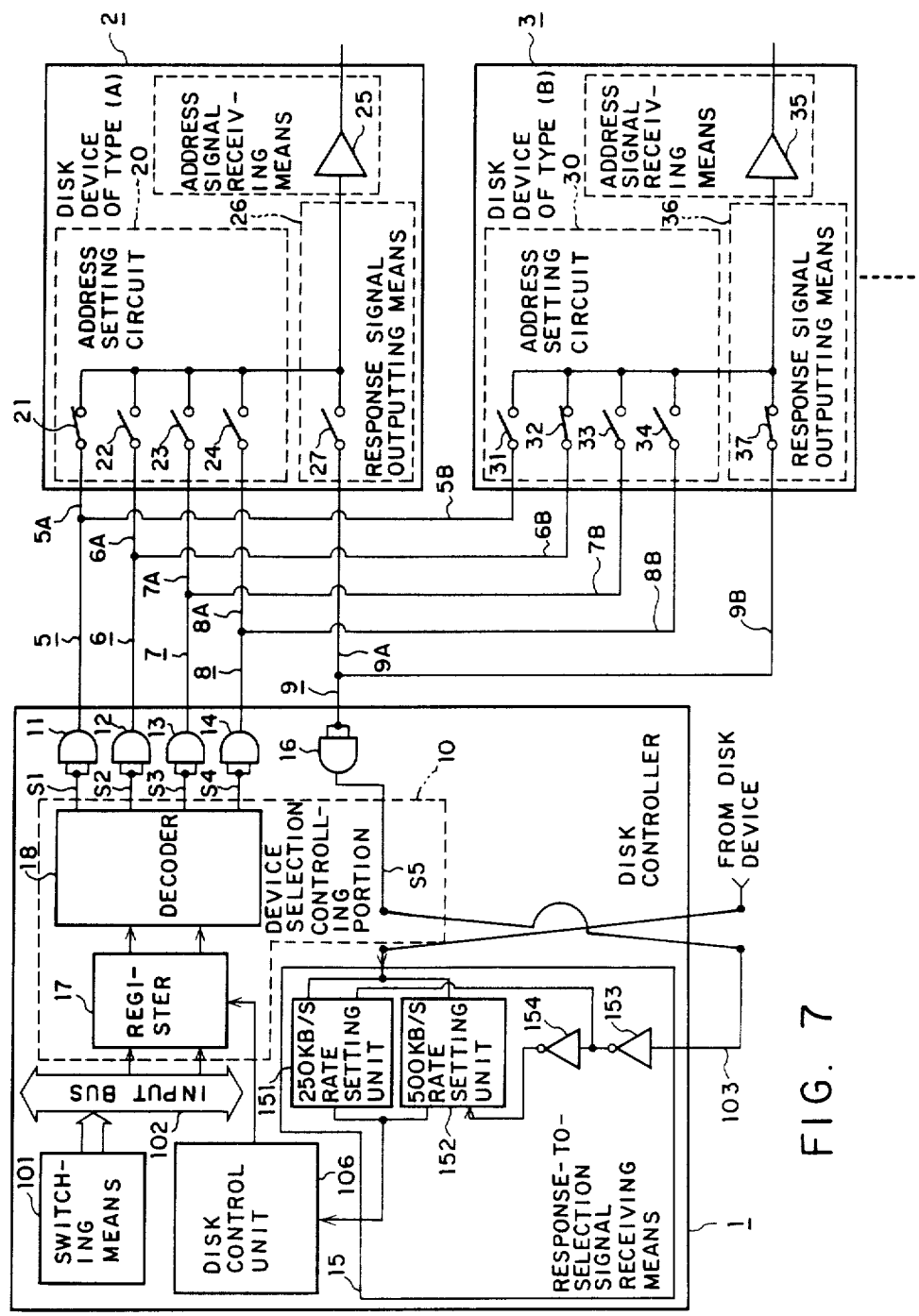
FIG. 7 is a schematic block diagram for explanation of another preferred embodiment of the system of disk device selector circuits for a disk controller according to the present invention.

Although, in the above description of the embodiment using FIG. 3, it has been described such that the selection signals S1–S3 are output via the transmitting gates 11–13 to two disk devices 2 and 3 of types (A) and (B), the present invention is not limited to it, but as shown in another embodiment of FIG. 7, for example, it can be arranged such that selection signals S1–S4 are output via transmitting gates 11–14.

And, although the embodiments of FIG. 3 and FIG. 7 have been described as those provided with controlling means for selecting one out of two disk devices 2 and 3 for types (A) and (B), the present invention is not limited to it, either. That is, the types of the plural disk devices as the objects of selection can, for example, be made, as described with reference to FIG. 1, to be four disk devices of types (A), (B), (C), and (D) [in which (C) and (D) were omitted from the illustration], or to be of three types (A), (B), and (C), or five types or more. In such cases, the number of bits of the response-to-selection signal may be decided according to the number of types of the disk devices as the objects of selection, and the number of switches for setting the type recognizing signals may be decided in accordance with the number of bits and the number of the response signal lines may be decided in accordance with the switches.

According to the present invention as described in detail in the foregoing, a response-to-selection signal indicating the type of the device is returned from the disk device selected by the disk controller. Therefore, the data transfer rate between the device and the controller can be correctly set up according to the type of the disk device.

Also, by being thus made capable of correct setting up of the data transfer rate and other parameters, occurrence of reading errors, malfunction, and other troubles can be prevented and smooth operation of the overall system can be achieved.

What is claimed is:

1. In a system of disk device selector circuits for a disk controller, provided for a disk controller having a selection controlling means for selecting an arbitrary one out of a plurality of magnetic disk devices constituted of different types and address signal transmitting means for delivering address signals of different bit patterns to different types of said magnetic disk devices to be selected by said selection controlling means; and the plurality of magnetic disk devices constituted of different types and connected with said disk controller via common control signal lines, each thereof having address setting means responsive to an address signal for confirming whether or not the device itself is selected by said disk controller and address signal receiving means for receiving the address signal when it is determined by said address setting means that the device itself has been selected; said system of disk device selector circuits for a disk controller comprising:

a response signal outputting means provided for each of said different types and plurality of magnetic disk devices for outputting a response signal to indicate that the device itself has been selected to said selection controlling means when the magnetic device is that device arbitrarily selected by said selection controlling means;

a response signal receiving means provided for said disk controller for receiving, via a common response signal line, the response signal from said response signal outputting means provided for each of said magnetic disk devices;

said address signal from said selection controlling means being in the form of a selection signal having one bit for selecting either one of two types of magnetic disk devices by each of a logical "1" or "0"; and each of said response signal outputting means being formed of a response-to-selection signal setting switch settable to include in said response signal one bit of a logical "1" or "0" indicative of the respective type of magnetic disk device for which said response signal outputting means is provided;

said response-to-selection signal setting switch being located in said response signal line between the junction point between an address setting circuit as said address setting means and a receiving gate as said address signal receiving means in each disk device and said response signal receiving means of said disk controller.

2. In a system of disk device selector circuits for a disk controller, provided for a disk controller having a selection controlling means for selecting an arbitrary one out of a plurality of magnetic disk devices constituted of different types and address signal transmitting means for delivering address signals of different bit patterns to different types of said magnetic disk devices to be selected by said selection controlling means; and the plurality of magnetic disks devices constituted of different types and connected with said disk controller via common control signal lines, each thereof having address setting means responsive to an address signal for conforming whether or not the device itself is selected by said disk controller and address signal receiving means for receiving the address signal when it is determined by said address setting means that the device itself has been selected; said system of disk device selector circuits for a disk controller comprising:

a response signal outputting means provided for each of said different types and plurality of magnetic disk devices for outputting a response signal to indicate that the device itself has been selected to said selection controlling means when the magnetic disk device is that device arbitrarily selected by said selection controlling means; and a response signal receiving means provided for said disk controller for, receiving, via a common response signal line, the response signal from said response signal outputting means provided for each of said magnetic disk devices;

said response signal receiving means including first and second rate setting units connected in parallel for setting two different data transfer rates depending upon selection of one out of two magnetic disk devices of different types and a series connection of first and second inverters connected between a response signal transmission line coming from the side of said disk devices and said second rate setting unit, the junction point between said first and second inverters being connected with said first rate setting unit.

3. A system of disk device selector circuits for a disk controller according to claim 2, wherein said response signal receiving means is provided, at the input side of said first and second rate setting means connected in parallel and disposed within said response signal receiving means, with a response signal receiving gate for receiving the signal returned from each of said magnetic disk devices through the response signal transmission line and outputting the same as the response signal to said receiving means.

4. A system of disk device selector circuits for a disk controller according to claim 2, wherein said response signal receiving means is formed of a receiving gate for receiving said response signal output from each of said different types and plurality of magnetic disk devices.

* * * * *

UNITED STATES PATENT AND TRADEMARK OFFICE
CERTIFICATE OF CORRECTION

PATENT NO. : 4,858,038

DATED : August 15, 1989

INVENTOR(S) : KOUJI KAZAMA

It is certified that error appears in the above-identified patent and that said Letters Patent is hereby corrected as shown below:

```
Col. 2, line 17, "... The" should be --... . The--;
Col. 2, line 48, after "and" insert --another--;
Col. 2, line 53, after "and" (first occurrence) insert
                 --another--;
Col. 2, line 58, after "and" (first occurrence) insert
                 --another--;
Col. 2, line 62, after "and" insert --another--.
Col. 4, line 62, after "6" insert --,--; same line,
                 after "(i)" insert --,--.
Col. 5, line 64, "deice" should be --device--.
Col. 7, line 2, after "from" insert --"0" to "1", and
                 therefore the output delivered to the--.
Col. 8, line 41, "disks" should be --disk--;
Col. 8, line 45, "conforming" should be --confirming--;
Col. 8, line 59, after "for" delete --,--.
```

Signed and Sealed this

Eighteenth Day of September, 1990

Attest:

HARRY F. MANBECK, JR.

*Attesting Officer*     *Commissioner of Patents and Trademarks*